(12) United States Patent
Fujimoto et al.

(10) Patent No.: US 10,589,380 B2
(45) Date of Patent: Mar. 17, 2020

(54) LAP WELDING METHOD, LAP JOINT, PRODUCTION METHOD OF LAP JOINT, AND AN AUTOMOBILE PART

(71) Applicant: NIPPON STEEL & SUMITOMO METAL CORPORATION, Tokyo (JP)

(72) Inventors: Hiroki Fujimoto, Tokyo (JP); Tohru Okada, Tokyo (JP); Takashi Imamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 747 days.

(21) Appl. No.: 15/114,186

(22) PCT Filed: Feb. 4, 2015

(86) PCT No.: PCT/JP2015/053119
§ 371 (c)(1),
(2) Date: Jul. 26, 2016

(87) PCT Pub. No.: WO2015/119159
PCT Pub. Date: Aug. 13, 2015

(65) Prior Publication Data
US 2017/0008124 A1 Jan. 12, 2017

(30) Foreign Application Priority Data

Feb. 6, 2014 (JP) .................................. 2014-021638

(51) Int. Cl.
*B23K 26/28* (2014.01)
*B23K 26/32* (2014.01)
(Continued)

(52) U.S. Cl.
CPC ............ *B23K 26/28* (2013.01); *B23K 26/244* (2015.10); *B23K 26/32* (2013.01); *B62D 27/023* (2013.01);
(Continued)

(58) Field of Classification Search
CPC ........ B23K 26/21; B23K 26/22; B23K 26/24; B23K 26/244; B23K 26/28; B23K 26/32;
(Continued)

(56) References Cited

U.S. PATENT DOCUMENTS 5,942,138 A * 8/1999 Toda ..................... B29C 64/141
219/121.72
7,586,061 B2 * 9/2009 Hoebel ................ B23K 26/032
219/121.83
(Continued)

FOREIGN PATENT DOCUMENTS

CN 103153523 A 6/2013
DE 10162452 A1 7/2003
(Continued)

OTHER PUBLICATIONS

Hedegärd et al., "Tempering of hot-formed steel using induction heating", Diploma work No. 54/2011, Chalmers University of Technology, Gothenburg, Sweden, 2011, total 66 pages, (URL: http://publications.lib.chalmers.se/records/fulltext/144308.pdf).
(Continued)

*Primary Examiner* — Jonathan P Masinick
(74) *Attorney, Agent, or Firm* — Birch, Stewart, Kolasch & Birch, LLP

(57) ABSTRACT

The present invention has as its object to inhibit fracture due to a HAZ softened part in substantially circular laser lap welding taking the place of resistance spot welding for joining a superposed plurality of steel sheets including a high strength steel sheet.
To solve this problem, the inventors discovered lap welding comprising superposing a plurality of steel sheets and firing a laser to form a substantially circular laser weld (1), which lap welding firing the laser in a straight line through an outer edge of the substantially circular laser weld (1) so as to form
(Continued)

a hardened part (8) at the steel sheets and thereby suppressing fracture arising from the HAZ softened part.

14 Claims, 12 Drawing Sheets

(51) Int. Cl.
| | |
|---|---|
| B23K 26/244 | (2014.01) |
| C21D 1/09 | (2006.01) |
| B62D 27/02 | (2006.01) |
| B23K 101/00 | (2006.01) |
| B23K 103/04 | (2006.01) |
| B62D 25/02 | (2006.01) |
| C21D 9/50 | (2006.01) |
| C21D 1/673 | (2006.01) |
| B62D 25/04 | (2006.01) |

(52) U.S. Cl.
CPC .......... *C21D 1/09* (2013.01); *B23K 2101/006* (2018.08); *B23K 2103/04* (2018.08); *B62D 25/02* (2013.01); *B62D 25/04* (2013.01); *C21D 1/673* (2013.01); *C21D 9/50* (2013.01); *C21D 2211/008* (2013.01); *C21D 2251/00* (2013.01)

(58) Field of Classification Search
CPC ... B23K 2103/04; F16B 5/08; Y10T 403/477; Y10T 403/478; B29C 66/112; B29C 66/1122
See application file for complete search history.

(56) References Cited

U.S. PATENT DOCUMENTS

| | | | | |
|---|---|---|---|---|
| 2003/0221752 A1* | 12/2003 | Utsumi | ............... | C22C 38/02 148/334 |
| 2006/0043076 A1* | 3/2006 | Larsson | ............... | B23K 11/061 219/121.64 |
| 2007/0007254 A1* | 1/2007 | Wang | ............... | B23K 11/061 219/91.22 |
| 2009/0302094 A1* | 12/2009 | Milam | ............... | B23K 11/0033 228/196 |
| 2011/0008648 A1* | 1/2011 | Okitsu | ............... | B23K 9/23 428/683 |
| 2011/0168682 A1* | 7/2011 | Hagihara | ............... | B23K 26/244 219/121.64 |
| 2011/0272384 A1* | 11/2011 | Matsushita | ............... | B23K 11/115 219/91.2 |
| 2012/0129006 A1* | 5/2012 | Kanai | ............... | B23K 11/115 428/683 |
| 2012/0160815 A1* | 6/2012 | Hayashimoto | ............... | B23K 26/28 219/121.64 |
| 2013/0087540 A1* | 4/2013 | Gu | ............... | B23K 26/32 219/121.64 |
| 2013/0168371 A1* | 7/2013 | Furusako | ............... | B23K 26/22 219/121.64 |
| 2015/0174702 A1* | 6/2015 | Fujimoto | ............... | B23K 11/115 428/594 |
| 2015/0209909 A1* | 7/2015 | Shimada | ............... | B23K 33/008 403/271 |
| 2015/0352672 A1* | 12/2015 | Kinoshita | ............... | B23K 26/244 219/121.63 |
| 2018/0236589 A1* | 8/2018 | Furusako | ............... | B23K 11/0026 |

FOREIGN PATENT DOCUMENTS

| | | |
|---|---|---|
| JP | 2001-71162 A | 3/2001 |
| JP | 2008-161911 A | 7/2008 |
| JP | 2008-178905 A | 8/2008 |
| JP | 2009-233712 A | 10/2009 |
| JP | 2009-241116 A | 10/2009 |
| JP | 2010-264503 A | 11/2010 |
| JP | 2013-189173 A | 9/2013 |
| WO | WO 2014/024997 A1 | 2/2014 |

OTHER PUBLICATIONS

International Search Report for PCT/JP2015/053119 dated Apr. 28, 2015.

Wästlund, "Tailored Properties for Press-Hardened Body Parts", Automotive Circle International, Insight Edition 2011, Ultra-high strength steels in car body lightweight design-current challenges and future potential, Sep. 21, 2011, total 14 pages.

Written Opinion of the International Searching Authority for PCT/JP2015/053119 (PCT/ISA/237) dated Apr. 28, 2015.

\* cited by examiner (a)

(b)

2mm (a)

(b)

(c)

(d)

(a)

(b)

(a)

(b)

(c)

(d)

(a)

(b)

LAP WELDING METHOD, LAP JOINT, PRODUCTION METHOD OF LAP JOINT, AND AN AUTOMOBILE PART

TECHNICAL FIELD

The present invention relates to lap welding of a plurality of steel sheets, a lap joint formed by that lap welding and a method of production of the same, and an automobile part having that lap weld joint.

BACKGROUND ART

Up until now, in structures formed using a plurality of steel sheet members, resistance spot welding has been used to join superposed steel sheet members in accordance with the function and usage environment. Forming spot welds having nuggets so as to form a lap welded member comprised of a plurality of steel sheet members has been a common practice. For example, in an automobile body having a monocoque structure, to improve impact safety and fuel efficiency, the general practice has been to superpose high strength steel sheets and join the flanges (superposed parts) by resistance spot welding.

In recent years, in the assembly of car bodies, remote laser welding has come to be used instead of the conventionally used resistance spot welding. Remote laser welding drives a galvanomirror to enable freedom of welding within a predetermined three-dimensional area. With remote laser welding, the galvanomirror attached to the front end of a robot arm can be moved quickly between welding points, so the welding tact time can be greatly shortened. Further, with remote laser welding, there is no shunting of welding current to existing welds such as with resistance spot welding, so it is possible to shorten the pitch between welds. The rigidity of the car body is also improved due to multipoint welding.

Remote laser welding is used in place of resistance spot welding, so usually a substantially circular laser weld, that is, a circular shape, oval shape, circular ring shape, oval ring shape, C-shape, long C-shape, multiple circular ring shape, or other welding shape, is used.

On the other hand, as the material forming a car body, in recent years, high strength steel sheet has been increasingly used. Cold pressed parts and hot pressed parts (hot stamped parts) of tensile strength 1500 MPa or other 1180 MPa or higher class high strength steel sheets have also come into use. For this reason, in the future, application of remote laser welding to 1180 MPa or higher class high strength steel sheet will be sought.

However, such high strength steel sheet has a metal structure mainly comprised of hardened martensite, so the surroundings of a laser weld are tempered, tempered martensite is formed, and the hardness falls. For example, in the case of 1500 MPa class high strength steel sheet, the hardness of the matrix material is Hv460 or so, but the hardness of the heat affected zone around a laser weld (hereinafter called "HAZ") locally falls to Hv300 or so and that part softens. This locally softened part is called a "HAZ softened part".

Such a HAZ softened part sometimes becomes the starting point of break of a steel sheet forming the car body at the time of impact of the vehicle. For example, in the case of a center pillar obtained by laser welding 1500 MPa class steel sheet to a flange as a reinforcement member, in a side collision test, sometimes a crack starts from the HAZ softened part of the flange and the center pillar breaks.

The phenomenon of breakage starting from the HAZ softened part formed by this laser welding remarkably occurs in a high strength steel sheet with a tensile strength of over 1180 MPa. In particular, it is remarkable in a laser weld of a tensile strength 1180 MPa or more high strength steel sheet formed with a hardened structure by a continuous annealing facility having a water cooling function or a high strength steel sheet formed by hot stamping (hot pressing). Remote laser welding enables the pitch between welds to be shortened so forms a large number of welds at a flange. However, if forming a large number of laser welds, a large number of HAZ softened parts are also formed, so that risk of break rises.

No countermeasures against break due to a HAZ softened part formed in a high strength steel sheet have been reported up to now. However, it has been reported that a similar phenomenon also occurs in the case of resistance spot welding.

NPLT 1 discloses treating a part in an A-pillar formed by hot stamping where there is a risk of break upon impact by heat treating it at the time of hot stamping so as to lower the strength of the matrix material and thereby inhibit HAZ softening resulting from resistance spot welding. Due to this, it is possible to prevent break of a structural member starting from the HAZ softened part.

NPLT 2 discloses the method of tempering the flange part of a B-pillar formed by hot stamping by high frequency heating so as to lower the strength of the matrix material so that HAZ softening does not occur even if performing resistance spot welding and thereby preventing break of the structural member starting from the HAZ softened part.

Further, as similar art, for example, PLT 1 discloses the art of combining laser welding and spot welding to ease the stress of a weld and suppress delayed break when welding high strength steel sheets to form a structural member for an automobile. PLT 2 discloses the art of laser welding a metal material to form a continuous weld along spot welds as art for improving the joint by welds. Furthermore, PLT 3 discloses the art of laser welding a spot weld or the surroundings of a spot weld as art for improving the joint strength of a weld.

CITATION LIST

Patent Literature

PLT 1. Japanese Patent Publication No. 2008-178905A
PLT 2. Japanese Patent Publication No. 2009-241116A
PLT 3. Japanese Patent Publication No. 2010-264503A Nonpatent Literature NPLT 1. Tailored Properties for Press-Hardened Body Parts, Dr. Camilla Wastlund, Automotive Circle International, Insight edition 2011, Ultra-high strength steels in car body lightweight design—current challenges and future potential NPLT 2. Tempering of hot-formed steel using induction heating, Olof Hedegard, Martin Aslund, Diploma work No. 54/2011 Chalmers University of Technology, Gothenburg, Sweden (URL: http://publications.lib.chalmers.se/records/fulltext/144308.pdf))

SUMMARY OF INVENTION

Solution to Problem

With the method of adjusting the strength for each portion of an A-pillar as disclosed in NPLT 1, low strength parts are unavoidably formed over a relatively wide range of the A-pillar. For this reason, the effect of hot stamping of imparting a high strength cannot be sufficiently enjoyed and the effect of lightening the weight also becomes limited. In addition, with this method, there are wide transitional regions between the hardened regions and nonhardened regions, the strength characteristics become uneven, and the impact performance of the A-pillar can become spotty.

With the method of tempering by high frequency heating after hot stamping as disclosed in NPLT 2, the thermal strain caused by the high frequency heating may cause the B-pillar to deform and the dimensional precision to drop. This is not limited to a B-pillar. Dimensional precision also has to be secured for structural members arranged around the door opening such as A-pillars and roof rails so that the clearances with for example the door panels become uniform over the entire circumferences of the door panels. If the dimensional precision of structural members arranged around the door openings falls, the quality of appearance of the vehicle can no longer be secured. For this reason, it is difficult to apply the art disclosed in NPLT 2 to the structural members around door openings.

Note that, it may be considered to design the B-pillar and other structural members so that the HAZ softened parts of the spot welds will not reach the breakage strain at the time of impact. However, such design will lead to an increase of thickness of the steel sheets forming the structural members and addition of reinforcement members and therefore will increase the cost and weight of the car body.

The art disclosed in PLT 1 is the art of inhibiting delayed break due to hydrogen embrittlement occurring right after continuous laser welding for joining superposed steel sheets. Hydrogen embrittlement is caused by the residual stress or strain accompanying welding concentrating at the starting and terminal ends of laser welding and the dissolved hydrogen in the steel concentrating there. Therefore, to prevent deformation of the steel sheets and ease the residual stress or strain, it is proposed to tack weld the sheets etc. at the scheduled positions for laser welding to suppress deformation of the steel sheets. That is, this art relates to suppressing deformation of the steel sheets arising in continuous laser welding and dealing with delayed break caused by hydrogen embrittlement and does not relate to replacing resistance spot welding and dealing with breakage due to the HAZ softened parts around substantially circular laser welds for joining superposed steel sheets.

The art disclosed in PLT 2 also performs resistance spot welding before performing continuous laser welding to thereby function as fastening means for joining superposed parts. That is, this art is also art for suppressing deformation of the steel sheets arising in continuous laser welding and does not relate to replacing resistance spot welding and dealing with break caused by the HAZ softened parts around substantially circular laser welds for joining superposed steel sheets.

The art disclosed in PLT 3 successively performs spot welding and laser welding so that even when a spot weld cannot be formed between a thick steel sheet adjoining a surface side steel sheet and that surface side steel sheet among two or more steel sheets, the laser welding enables the surface side steel sheet and this thick steel sheet to be welded for reliable lap welding. That is, this art also does not relate to replacing resistance spot welding and dealing with break caused by the HAZ softened parts around substantially circular laser welds for superposing steel sheets.

In the above way, as the joint for superposing steel sheets including a high strength steel sheet (in particular, 1180 MPa or higher class steel sheet), application of laser welding has been sought for replacing resistance spot welding. Despite this, no effective measure has been devised for dealing with breaks caused at the HAZ softened parts. The present invention was made in consideration of such a situation and has as its object to inhibit breaks due to fractures arising at HAZ softened parts even when performing laser welding for joining a plurality of superposed steel sheets including a high strength steel sheet. In particular, it has as an urgent object to devise effective measures inhibiting break at low strain at the time of application to pillars and other impact resistant structural members of automobiles. Below, in this Description, laser welding for joining superposed steel sheets will be called "laser lap welding" and the welded parts will be called "laser lap welds". Further, in this Description, unless particularly indicated otherwise, 1180 MPa or higher class steel sheet will be called "high strength steel sheet".

Solution to Problem

The inventors etc. engaged in in-depth studies for solving the above problems and as a result discovered that by firing a laser beam cutting across a substantially circular laser lap weld up to the outside of the HAZ softened part and forming a rehardened part, it is possible to inhibit concentration of strain at the HAZ softened part and inhibit break at the HAZ softened part. The inventors etc. engaged in further studies and obtained the following findings.

(a) They discovered that by firing a laser to reheat and harden a HAZ softened part formed by laser lap welding, it is possible to raise the once softened part in hardness, eliminate the softened part, and thereby inhibit break starting from this HAZ softened part. They also discovered that it is sufficient to harden the HAZ softened part by reheating by firing a laser. That is, it is possible to fire a laser to melt and solidify that part, but melting and solidification are not necessarily required. In this Description, hardening by firing a laser will be called "laser hardening" and the hardened part will be called the "laser hardened part".

(b) They discovered that hardening by reheating should be performed in a substantially straight line in the principal stress direction. In this Description, the maximum stress direction will be called the "principal stress direction". The strain at this time will be called the "main strain". Usually, an impact resistant member using high strength steel sheet as a reinforcement member is determined by the direction in which the impact stress is applied. In a pillar and other members of an automobile, the long direction of the flange becomes the principal stress direction. Therefore, it is sufficient to take measures to inhibit fracture in this direction.

(c) They discovered that a softened part is also formed around a laser hardened part and that the terminal end (ending end) becomes a starting point of new fracture, but the curvature of this terminal end is smaller compared with the HAZ softened part of the laser lap weld, so fracture can be remarkably suppressed. That is, since the laser is fired in the principal stress direction in a straight line, the part becoming the starting point of fracture becomes a softened part formed at the terminal end of the laser hardened part. The inventors etc. conducted experiments and confirmed that a softened part is formed at the outside from the laser hardened part by 1 mm or so. That is, the radius of curvature of the softened part of the terminal end depends on the laser scan width. Compared with the circle equivalent diameter (radius of curvature) of a substantially circular shape laser lap weld, the radius of curvature of the terminal end of the laser hardened part (laser scan width) is small. The length of an arc when viewed by a certain center angle is proportional to the radius of curvature. Therefore, the length of the arc at the terminal end of the laser hardened part when making the center angle the same as the center angle of the part of the HAZ softened part restored in hardness due to the laser lap welding becomes remarkably shorter compared with the length of the part of the HAZ softened part restored in hardness. For this reason, by performing straight line laser hardening in the principal stress direction, it is possible to greatly suppress the occurrence of fracture. Usually, the diameter of a laser lap weld made in a substantially circular shape is 2 to 15 mm or so. On the other hand, the laser scan width at reheating (same as beam diameter) is 0.15 to 0.9 mm or so. Therefore, if the laser scan width at the time of reheating is smaller than the diameter of the laser lap welding (radius of curvature of part through which hardened part runs), it is possible to obtain a fracture inhibiting effect. In particular, if the laser scan width is 50% or less of the diameter of the laser lap weld (radius of curvature), fracture due to the softened part can be remarkably suppressed. More preferably, the width should be made 40% or less, still more preferably 30% or less. On the other hand, if making the laser scan width too narrow, the effect of inhibiting fracture at the HAZ softened part falls. For this reason, the laser scan width should be at least 10% of the diameter of the laser lap welding (radius of curvature of part through which hardened part passes). More preferably, it should be 20% or more.

(d) The most softened part of laser lap welding is formed at 1 to 2 mm or so at the outside of the melted part. For this reason, the length of the laser hardened part must be made 3 mm or more from the outer edge of the laser lap weld. Preferably, the length of the laser hardened part may be made 5 mm or more from the outer edge of the laser lap weld, if possible 6 mm or more.

(e) The reheating temperature by the laser firing action (hardening temperature) may be the A3 point of the steel sheets or more. When firing a laser for heating, if stopping the operation, the sheets are rapidly cooled, so once reaching a temperature of the A3 point or more, hardening occurs. Further, there is no problem even if once making the material melt. If making it melt once, the chemical components of the assembled steel sheets become diluted, but stress concentrates at the most softened part formed at the outer circumference and the problem remains of forming the starting point of fracture.

(f) Based on the above findings, the inventors etc. prepared test pieces where a laser was fired in a straight line in the principal stress direction cutting across the HAZ softened part of the laser lap welding and ran tensile tests, whereupon they confirmed that the elongation at break became greater compared with the case of just laser lap welding (FIG. 4). That is, they confirmed that the problem of low strain breakage could be resolved.

The present invention was made based on the above findings and has as its gist the following:

(1) Lap welding method comprising superposing a plurality of steel sheets and firing a laser to form a substantially circular laser weld, which lap welding method firing the laser in a straight line through an outer edge of the substantially circular laser weld so as to form a hardened part at the steel sheets.

(2) The lap welding method according to (1) wherein the straight line laser firing operation fires the laser in a principal stress direction found in advance.

(3) The lap welding method according to (1) or (2) wherein the straight line laser firing operation fires the laser over at least 3 mm from an outer edge of the substantially circular laser weld.

(4) The lap welding method according to any one of (1) to (3) wherein the "substantially circular" is a circular shape, oval shape, circular ring shape, oval ring shape, C-shape, long C-shape, or multiple circular ring shape.

(5) The lap welding method according to any one of (1) to (4) wherein a fired width of the straight line laser fired part is smaller than a curvature diameter of the part of the outer edge of the substantially circular laser weld through which the laser is fired in a straight line.

(6) The lap welding method according to any one of (1) to (5) wherein at least one steel sheet among the plurality of steel sheets is a steel sheet having a martensite structure.

(7) The lap welding method according to (6) wherein the steel sheet having a martensite structure is a steel sheet having a tensile strength of 1180 MPa or more.

(8) A lap joint obtained by superposing a plurality of steel sheets and firing a laser to form substantially circular laser weld so as to join the plurality of steel sheets, which lap joint provided with a hardened part formed in a straight line by firing the laser through an outer edge of the substantially circular laser weld.

(9) The lap joint according to (8), wherein the straight line hardened part is formed in a principal stress direction found in advance.

(10) The lap joint according to (8) or (9) wherein the straight line hardened part is formed over at least 3 mm from an outer edge of the substantially circular laser weld.

(11) The lap joint according to any one of (8) to (10) wherein the "substantially circular" is a circular shape, oval shape, circular ring shape, oval ring shape, C-shape, long C-shape, or multiple circular ring shape.

(12) The lap joint according to any one of (8) to (11) wherein a fired width of the straight line hardened part is smaller than a curvature diameter of the part of the outer edge of the substantially circular laser weld through which the straight line hardened part crosses or contacts.

(13) The lap joint according to any one of (8) to (12) wherein at least one steel sheet among the steel sheets is a steel sheet having a martensite structure.

(14) The lap joint according to (13) wherein the steel sheet having a martensite structure is a steel sheet having a tensile strength of 1180 MPa or more.

(15) A method of production of a lap joint produced by superposing a plurality of steel sheets and firing a laser to form a substantially circular laser weld, which method of production of a lap joint fires the laser in a straight line through the outer edge of the substantially circular laser weld so as to form a hardened part at the steel sheets.

(16) An automobile part provided with a lap joint according to any one of (8) to (14).

Note that, the shape of the laser lap welding according to the present invention is not particularly an issue. However, the shape of laser lap welding for replacing the usual resistance spot welding is substantially circular. The "substantially circular" referred to here is a circular shape, oval shape, circular ring shape, oval ring shape, C-shape, long C-shape, or other combination of arcs or further a multiple circular ring shape or multiple combination of arcs. Further, the present invention can also be applied to laser welding for filling in the insides of these. Furthermore, while not generally used, the present invention can also be applied to a shape not substantially circular. For example, it may also be a triangular shape, rectangular shape, or other polygonal shape.

Advantageous Effects of Invention

According to the present invention, even when superposing a plurality of steel sheet members and joining them by laser lap welding, no starting points of fracture will be formed at the HAZ softened parts around the laser lap welds and the members can be kept from breaking at a low strain. For this reason, for example, it is possible to provide a high strength automobile part which has impact resistance excellent for performance in protecting passengers at the time of impact.

BRIEF DESCRIPTION OF DRAWINGS

FIG. 1 show a tensile test piece, wherein FIG. 1A shows the piece as a whole and FIG. 1B shows a cross-section along a centerline of the test piece.

FIG. 2A is a view showing a position for investigation of hardness in a circular shape laser weld at a 1310 MPa class steel sheet, while FIG. 2B is a view showing a hardness distribution of a circular shape laser weld.

FIG. 5A is a view showing a break position in a tensile test of Invention Example 1, while FIG. 5B is a view showing a break position in a tensile test of Invention Example 2.

FIG. 12A is a view showing a break position of a comparative example, while FIG. 12B is a view showing a break position of an invention example.

FIG. 13 are views showing the hardness distribution of a C-shape laser lap joint in an invention example, wherein FIG. 13A is a view showing a position of measurement of the hardness distribution of the lap joint according to the present invention, FIG. 13B is a view showing the hardness distribution of a terminal end of a straight line laser scanned part, FIG. 13C is a view showing a hardness distribution of an intermediate part of the straight line laser scanned part, and FIG. 13D is a view showing a hardness distribution of a substantially circular laser lap weld.

DESCRIPTION OF EMBODIMENTS

First, a welding method using a laser beam according to the present invention will be explained.

The laser welder is not particularly limited. As examples, a disk laser, fiber laser, YAG laser, and $CO_2$ gas laser can be used. A beam diameter of 0.15 to 0.9 mm in range, an output of 1 to 10 kW in range, and a welding speed of 1 to 25 m/min in range can be illustrated. The conditions for laser welding are suitably determined by the types of the steel sheets, the thicknesses of the steel sheets, etc. and are not limited to the above illustrations.

The welding may be general welding by a torch carried by a robot, but is preferably remote laser welding using a galvanomirror. "Remote laser welding" is the art of combining a long focal point focus lens with a specialized scanning mirror and firing the laser beam through space to make the laser spot scan the surface at a high speed to perform welding. Compared with the robot or NC device used for conventional laser welding, the beam travel time becomes substantially zero, so high efficiency welding becomes possible. This system has the merit of not requiring almost any travel time of the laser spot from a weld location being worked to the next weld location.

At the step of forming the hardened part, a laser beam is fired at the lap part to form a substantially circular laser weld, then is run across the HAZ softened part formed around the substantially circular laser weld (outer circumference) to form a straight line hardened part and thereby make the HAZ softened part around the substantially circular laser weld harden. Therefore, by firing a laser through the outer edge of the laser lap weld in a straight line, it is possible to form a hardened part so as to split the HAZ softened part. Here, "through the outer edge of the laser lap weld" indicates the state of crossing the outer edge of the laser lap weld or contacting it.

Figure 2:
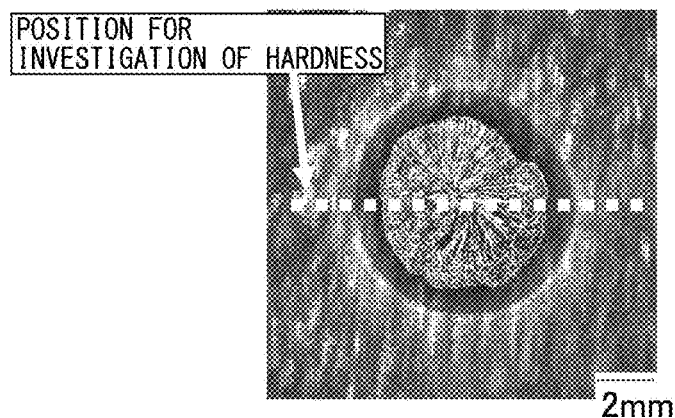
Figure 2:
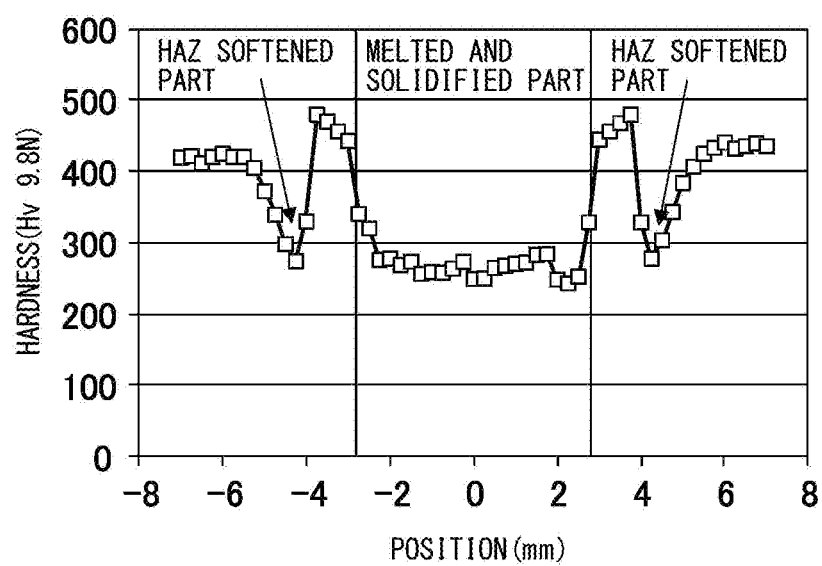
Figure 13:
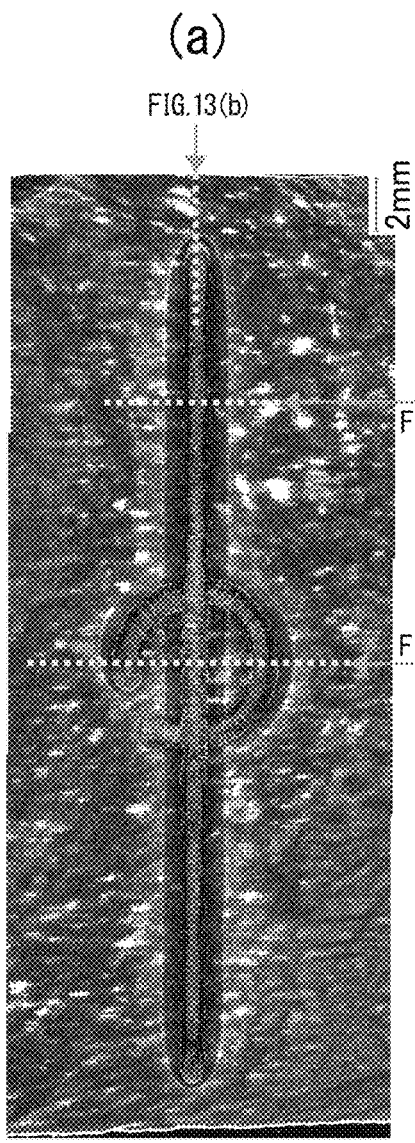
Figure 13:
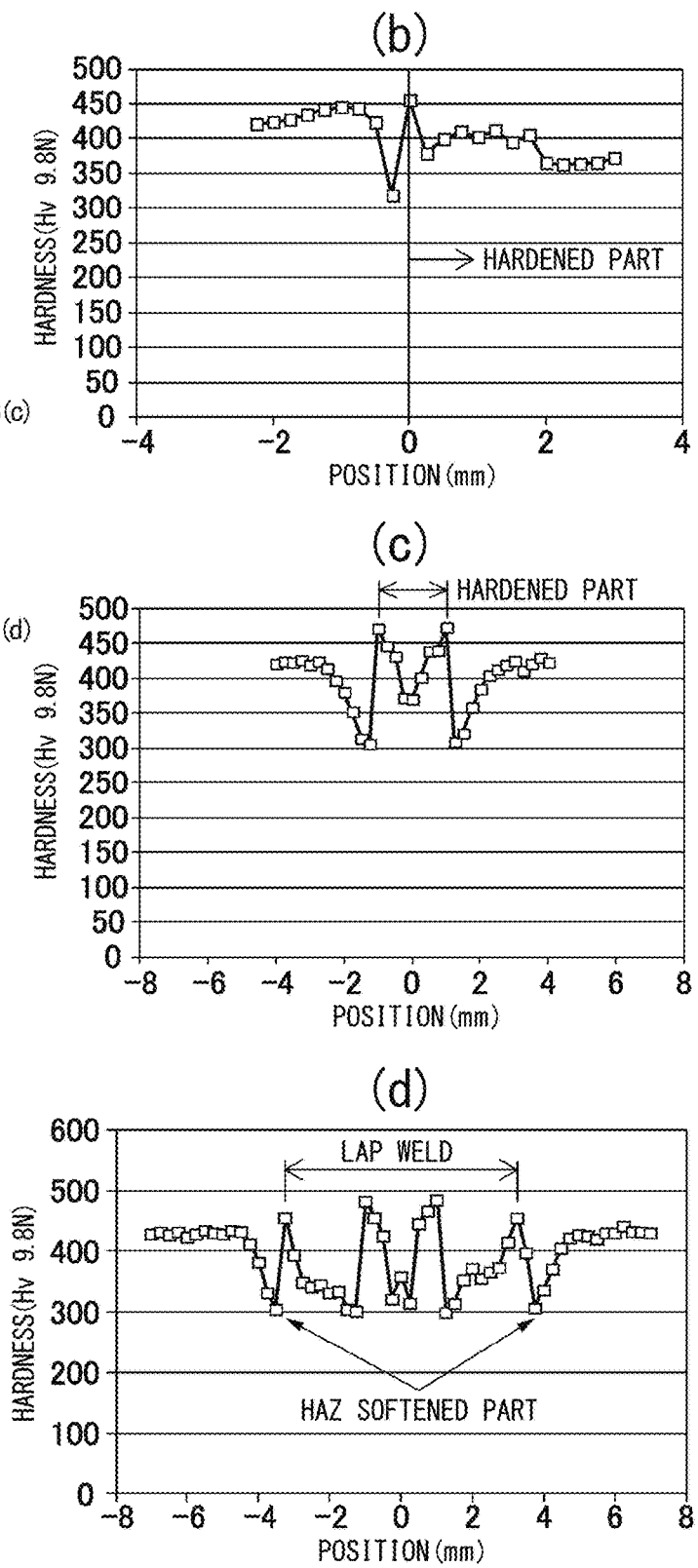

A laser lap weld is a melted and solidified part shown as shown in FIG. 2B. Therefore, the outer edge of the laser lap weld indicates the boundary between the melted and solidified part and the matrix metal. FIG. 2 shows an example where the center part of the circular shape is also made to melt and solidify. FIG. 13 shows a C-shape, but in this case as well, the laser lap weld is a melted and solidified part. The thinking is the same.

FIG. 13A shows an example of laser hardening so as to cut across a C-shape laser lap weld. This shows the hardness distribution of the surface of a steel sheet in the direction shown by the dotted line in FIG. 13A. FIGS. 13B, 13C, and 13D show the hardness distributions of the surface of a steel sheet at the laser hardened part terminal end (ending end), laser hardened part, and laser lap weld.

The "hardened part", as shown in FIG. 13C, indicates the region sandwiched between the local maximum points of hardness appearing sandwiching a laser scanned part when measuring the hardness distribution across the laser hardened part. Around a hardened part, a softened part can be formed due to the heat input at the time of hardening. In FIG. 13C, there is a part showing the local minimum value of hardness at the outside of the peak of hardness. This is the part softened by laser hardening.

The state of hardness of the terminal end (ending end) of the laser hardened part is shown in FIG. 13B. FIG. 13B is a view showing the hardness distribution in the laser firing direction. The local maximum point of the hardness in FIG. 13B is the terminal end (ending end) of the hardened part. The right side becomes the hardened part. As will be understood from FIG. 13B there is a part showing the local minimum point immediately to the outside of the local maximum point of hardness. This is the part softened by laser hardening.

Further, the hardened part is preferably formed at 50% or more of the thickness of the high strength steel sheet (in particular, steel sheet including martensite structure).

Further, the straight line hardened part may be positioned in the principal stress direction envisioned at the time of impact. Alternatively, when laser welding flange shaped steel sheet members, the direction of extension of this flange may be made the principal stress direction. Even if off from the principal stress direction due to the precision of the laser welding etc., the angle of that deviation is preferably as small as possible. Therefore, the straight line hardened part is preferably formed in a range of within ±30° with respect to the principal stress direction. If the hardened part is formed in a range of within ±30° with respect to the principal stress direction, it can be deemed to have been formed in the principal stress direction. More preferably, the range may be within ±15° with respect to the principal stress direction. Still more preferably, the range may be within ±10° with respect to the principal stress direction.

Note that, the principal stress direction can be found in advance at the design stage. The method of finding the principal stress direction in advance is not limited. For example, the finite element method (FEM) or other simulation can be used to find it. Alternatively, a model or actual shape test member can be used for testing to find it. There may also be a plurality of principal stress directions. In this case, it is sufficient to fire the laser in a straight line matching each principal stress direction so as to form hardened parts.

By firing a laser for reheating so as to form a straight line hardened part, the HAZ softened part around the substantially circular laser lap weld is split and a drop in strength in the principal stress direction due to the HAZ softened part is suppressed. Note that, the straight line hardened part need only split the HAZ softened part of the laser lap weld, so need not necessarily be continuously formed in a straight line inside the laser lap weld.

The steel sheet to which the present invention can be applied is not limited. However, HAZ softening remarkably occurs at steel having a martensite structure. If applying the present invention to such a steel sheet, the effect is large. As steel sheet having a martensite structure, there is high strength steel having a 1180 MPa or more tensile stress. Such high strength steel is often used for hot stamping (hot press forming) and is sometimes called "hot stamp-use steel". Further, the presence or absence of plating is not an issue.

The lap joint according to the present invention may be applied to any steel member. In particular, the obtained effect is large by application to an automobile member in which impact resistance is sought.

The present invention will be explained based on specific examples. For example, if the center pillar of an automobile is impacted, a tensile load will be applied to the flange part where the inner member panel and outer member panel are lap welded. For this reason, strain will concentrate at the HAZ softened part of the circular shape laser lap welded formed at the flange causing it to break. The inventors etc. ran tests envisioning such a case.

Figure 1:
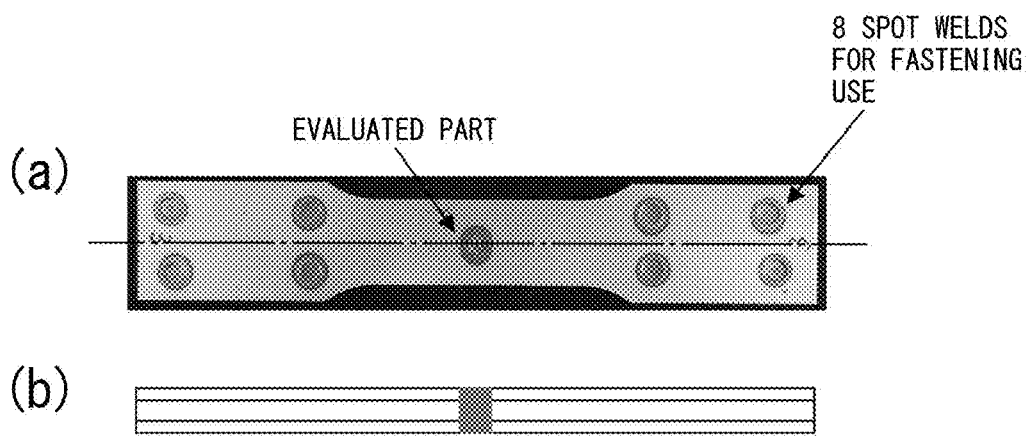

FIG. 1 is an explanatory view showing a tensile test piece. A 440 MPa class steel sheet (thickness 1.2 mm), a 1310 MPa class steel sheet (thickness 1.4 mm), and a 270 MPa class hot dipped galvannealed steel sheet (thickness 0.7 mm) were superposed and fastened by resistance spot welding at the gripping parts of the test piece. Circular shape laser lap welding was performed at the center part of the test piece. A fiber laser was used for laser welding under conditions of a beam diameter of 0.6 mm, an output of 2.0 kW, and a welding speed of 2.0 m/min so as to form a test piece having a laser lap weld shown in FIG. 4A of a circular shape of a diameter of about 7 mm welded inside the circle as well.

FIG. 2A is an explanatory view showing the position for investigation of hardness of a circular shape laser weld in a 1310 MPa class steel sheet, while FIG. 2B is an explanatory view showing the hardness distribution of a circular shape laser weld.

As shown in FIG. 2A and FIG. 2B, in circular shape laser welding of 1310 MPa class steel sheet, the HAZ around the hardened part was tempered and softened.

Figure 3:
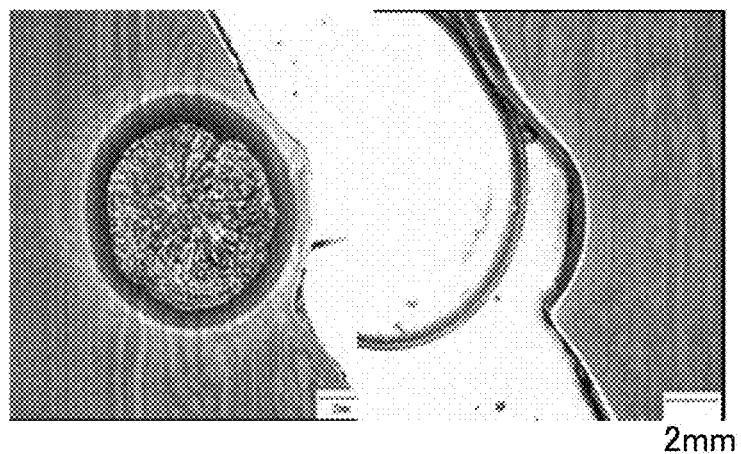
FIG. 3 is a view showing a break at a HAZ softened part of a circular shape laser weld.

FIG. 3 is an explanatory view showing a break position of a circular shape laser lap welded joint. When performing a tensile test, as shown in FIG. 3, it was learned that strain concentrated at the HAZ softened part around the laser weld of the 1310 MPa class steel sheet causing it to break.

Figure 4:
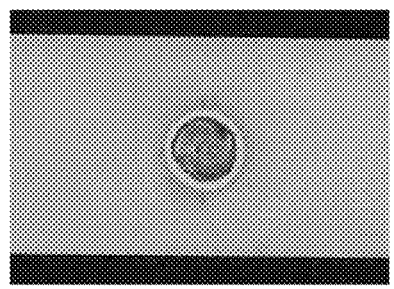
FIG. 4A is a view showing a laser weld joint of a comparative example in a tensile test.
FIG. 4B is a view showing a laser weld joint of Invention Example 1.
FIG. 4C is a view showing a laser weld joint of Invention Example 2.
FIG. 4D is a graph of load-elongation of the comparative example, Invention Example 1, and Invention Example 2 in a tensile test.
Figure 4:
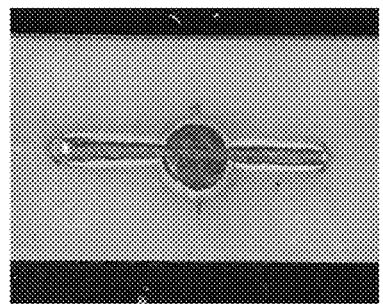
Figure 4:
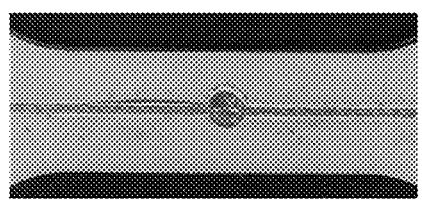
Figure 4:
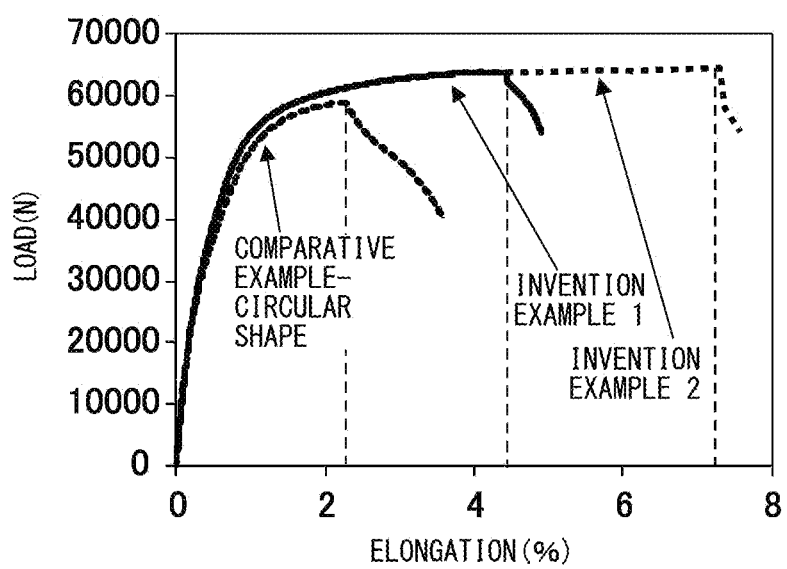
Figure 5:
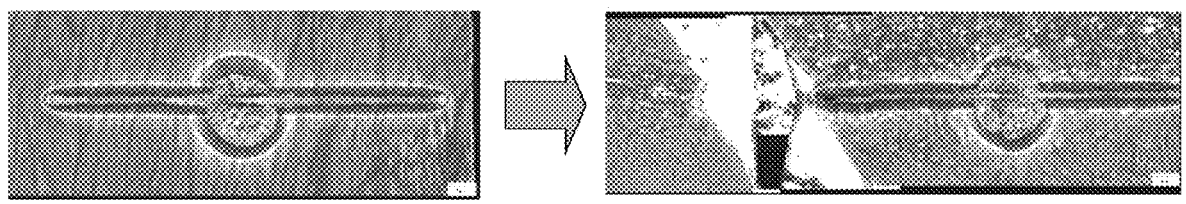
Figure 5:
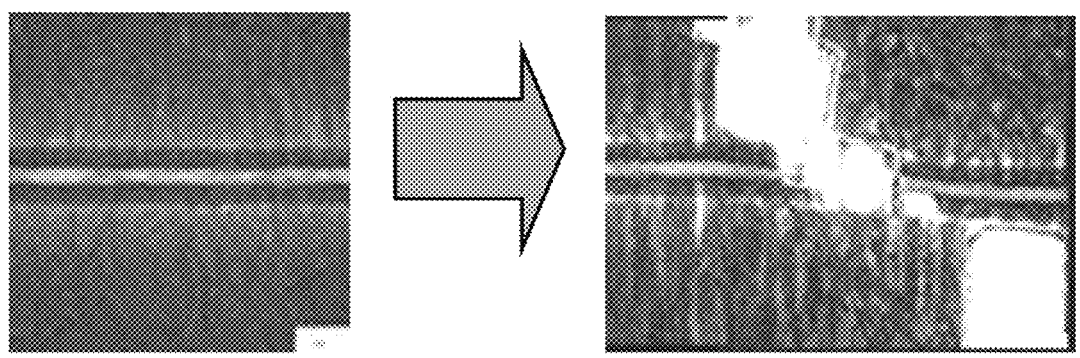
Figure 6:
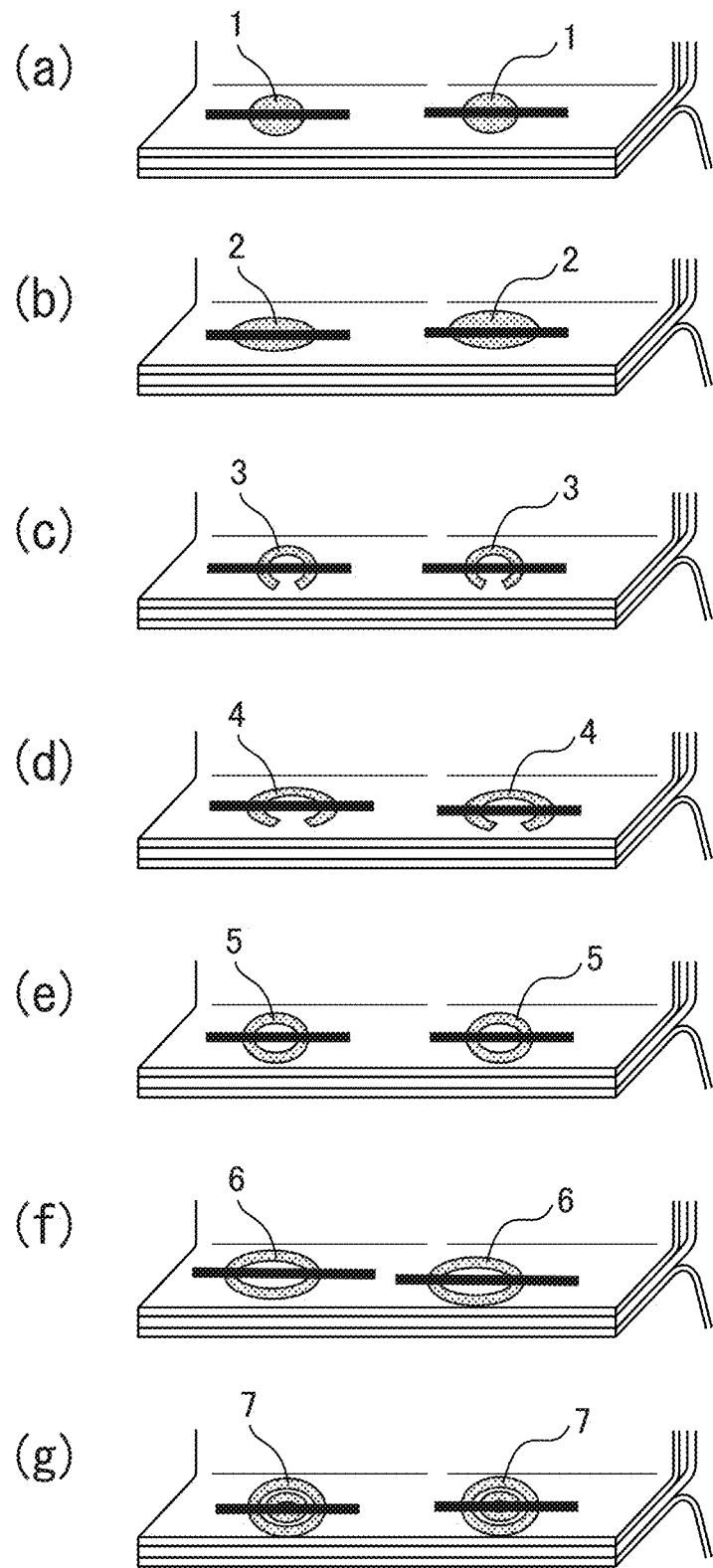
FIG. 6A to FIG. 6G are views showing examples of an embodiment of the present invention.
Figure 7:
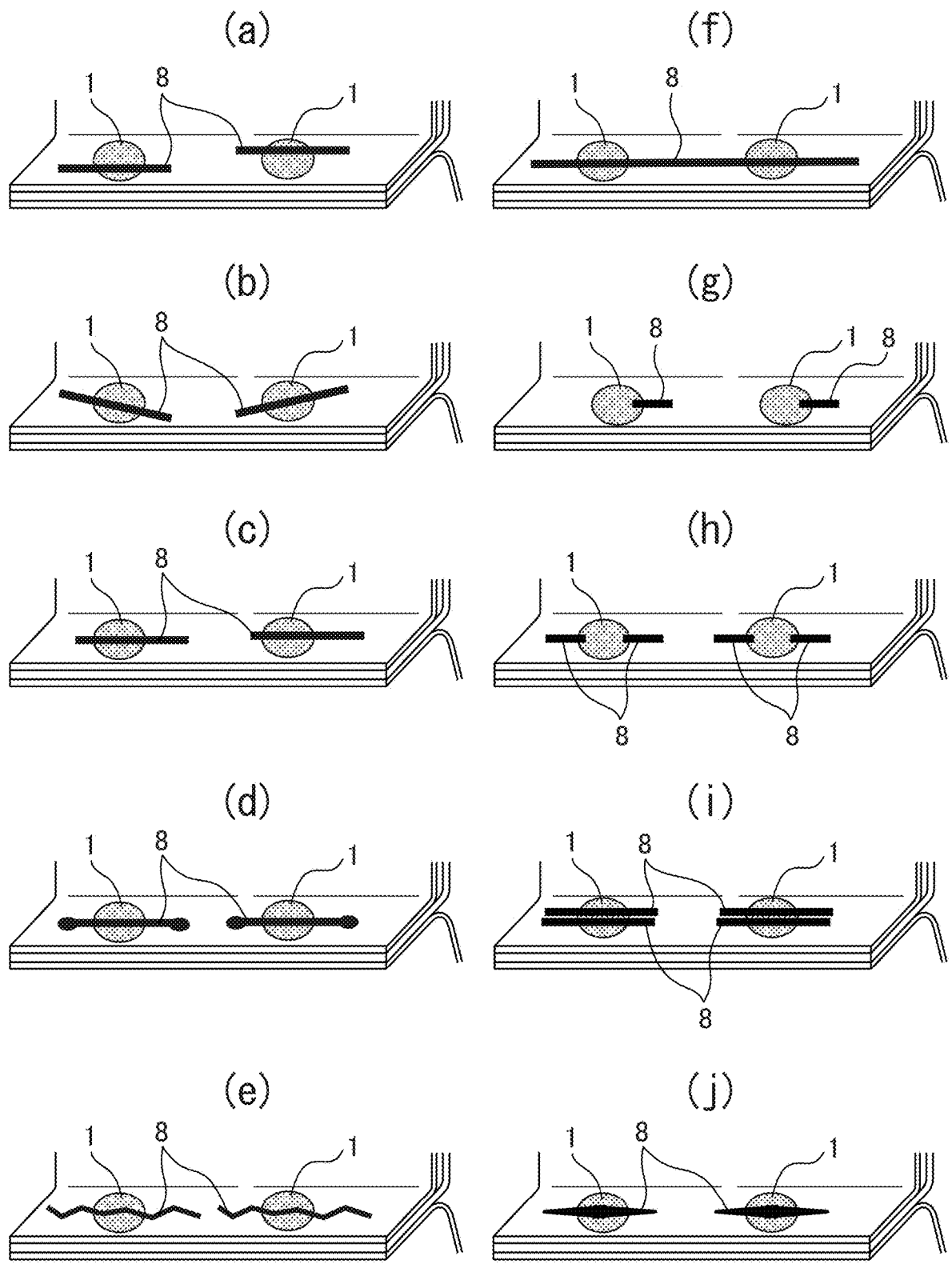
FIG. 7A to FIG. 7J are also views showing examples of an embodiment of the present invention.

FIG. 4 show a comparative example in the tensile test (FIG. 4A), Invention Example 1 (FIG. 4B), Invention Example 2 (FIG. 4C), and a load-elongation graph of the same (FIG. 4D). The comparative example (FIG. 4A) shows the case of only laser lap welding. Invention Example 1 (FIG. 4B) shows the case of firing a laser in a straight line from an outer edge of the laser lap welding along the axial direction of the test piece (principal stress direction) to form a hardened part. The laser was fired from a point 12 mm separated from the lap weld edge and cut across the laser lap weld so as to extend in a straight line in a length from the point 12 mm separated from the lap weld edge of 31 mm. Invention Example 2 (FIG. 4C) is the case of forming the laser hardened part up to the gripping parts of the test piece. It is a test piece designed so that the terminal end of the laser hardened part does not form a starting point of fracture. A tensile test was run with a distance between prepared welds evaluated of 50 mm and a tensile speed of 3 mm/min. FIG. 5 are explanatory views showing break positions of Invention Example 1 (FIG. 5A) and Invention Example 2 (FIG. 5B).

The results of measurement of the elongation at break are shown in FIG. 4D. It will be understood that the "comparative example" had an elongation at break of a small one of 2.3% or so and that low strain breakage occurred. Invention Example 1 had an elongation at break of 4.3%. Even compared with the comparative example, the elongation at break was improved over the comparative example by about 87%. Further, it could be confirmed that the location of break was the terminal end of the laser hardened part (FIG. 5A). As a result, it could be confirmed that Invention Example 1 solved the problem of low strain breakage compared with the comparative example. Note that, the melted metal part of the lap weld softens due to being mixed with elements of the steel sheets, but this part is comprised of three steel sheets superposed and is large in thickness, so does not break at the melted metal part.

For Invention Example 2, the elongation at break was 7.3% or so. Compared with the comparative example, it was improved about 317%. It could be confirmed that the location of break was the middle of the laser hardened part (FIG. 5B). That is, it could be confirmed that the example did not break at the HAZ softened part of the lap welding. As a result, it could be confirmed that Invention Example 2 solved the problem of low strain breakage compared with the comparative example and Invention Example 1. Note that, for observation of the broken surface, the broken surface of the high strength steel sheet in the test piece (in the above test piece, the 1310 MPa class steel sheet) was observed.

FIG. 6A to FIG. 6G are explanatory views showing various substantially circular laser lap welds 1 to 7 assuming flanges. In this case, the principal stress direction is the long direction of the flange (left-right direction in the figure). The present invention, as shown in FIG. 6A to FIG. 6G, can be applied to laser lap welding of a circular shape 1, oval shape 2, C-shape 3, long C-shape 4, circular ring shape 5, oval ring shape 6, and double circular ring shape 7.

FIG. 7A to FIG. 7J are explanatory views showing straight line laser hardened parts 8 formed cutting across HAZ softened parts formed around circular shape laser lap welds 1. FIG. 7 also assume a flange. In the same way as FIG. 6, the principal stress direction is the long direction of the flange (left-right direction in the figure).

As shown in FIG. 7A, the straight line laser hardened part 8 need not necessarily run through the center of the circular shape laser weld 1.

As shown in FIG. 7B, the direction of formation of the straight line laser hardened part 8 may be within 30° of the assumed principal stress direction.

As shown in FIG. 7C, the left and right lengths of the straight line laser hardened part 8 need not necessarily be the same, but the laser hardened part 8 has to be formed up to a position separated by at least 3 mm outward from the end of the substantially circular laser weld 1.

As shown in FIG. 7D, the end of the straight line laser hardened part 8 may be made broader so as to suppress stress concentration. However, the size has to be smaller than the circular shape laser weld 1.

As shown in FIG. 7E, the straight line laser hardened part 8 may be bent if within ±30° of the assumed principal stress direction.

As shown in FIG. 7F, a plurality of circular shaped laser hardened parts 1, 1 were continuously connected by a single straight line laser weld 8.

As shown in FIG. 7G and FIG. 7H, the straight line laser hardened part 8 need not run through the inside of the circular shape laser lap weld 1.

As shown in FIG. 7I, there may be a plurality of laser hardened parts 8. If there are a plurality of principal stress directions, the laser hardened parts may be formed in those directions.

As shown in FIG. 7J, the width of the laser hardened part may also be changed. In particular, as shown in FIG. 7I, the width of the laser hardened part should be broader than the outer edge of the laser lap weld and narrower at the terminal end.

Figure 8:
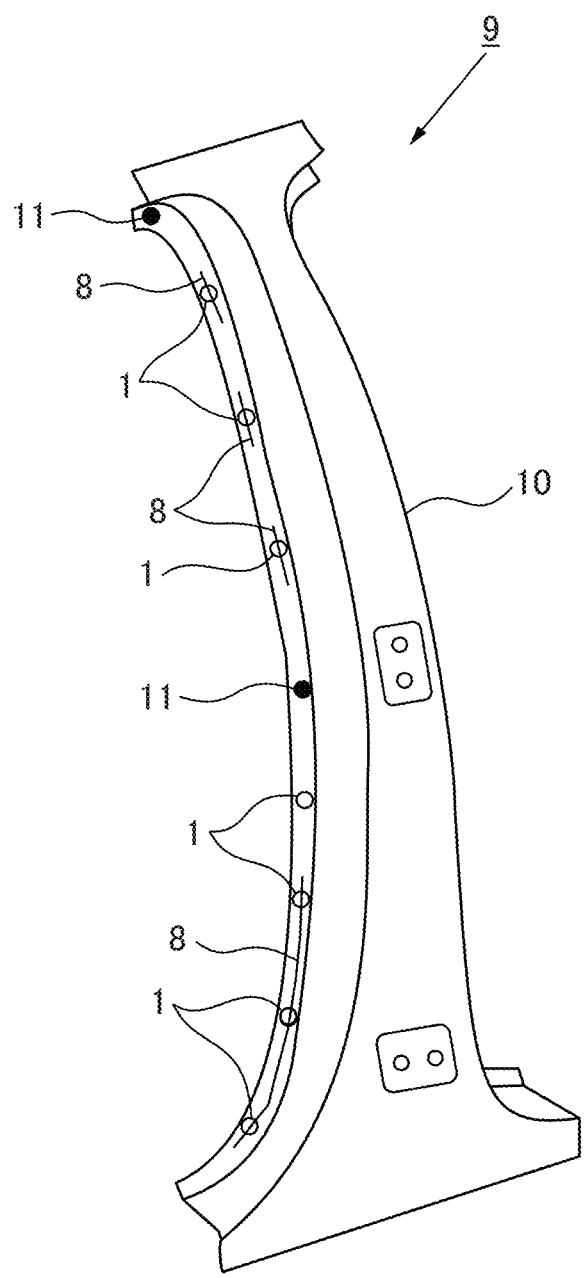
FIG. 8 is a view showing an example of application of the present invention to a center pillar.

The state of application of the present invention to an automobile part will be explained next. FIG. 8 is an explanatory view showing the state of application of the present invention to a center pillar 9.

In the process of production of a side panel, a side panel outer member (not shown) comprised of a 270 MPa class hot dipped galvannealed steel sheet, a center pillar reinforcement member 10 comprised of a hot stamped member, and a center pillar inner member (not shown) comprised of a 590 MPa class steel sheet are superposed at flanges formed at their edge parts and resistance spot welded to tack them by spot welds 11.

The assembled side panel is assembled with the under body at the main body line, is tack welded, then is further welded by remote laser welding.

At this time, as shown in FIG. 8, circular shape laser lap welding is performed to form the laser lap weld 1, then the HAZ softened part around the circular shape laser lap weld 1 is split by firing a laser in a straight line to form the laser hardened part 8.

Note that, as shown in FIG. 8, the operation of firing a laser for splitting the HAZ softened part around the circular shape laser lap weld 1 does not have to be performed for all of the laser lap welds 1. It need only be performed for a laser lap weld 1 with a possibility of break at the HAZ softened part.

Figure 9:
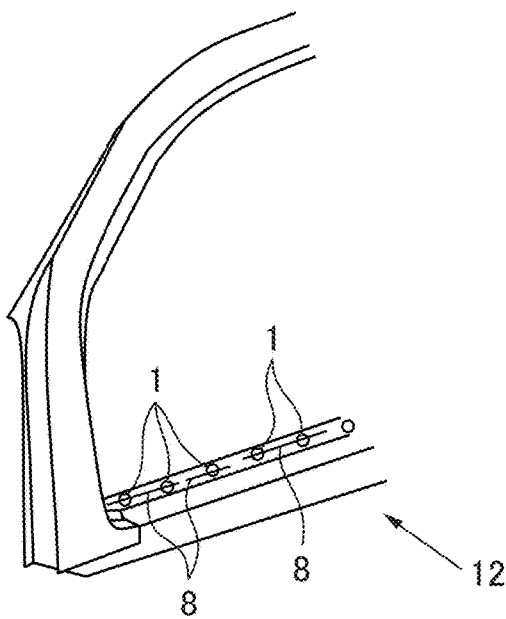
FIG. 9 is a view showing an example of application of the present invention to a side sill.

FIG. 9 is an explanatory view showing the state of application of the present invention to a side sill 12. The side sill 12 also, in the same way as the center pillar 9, is assembled with the under body at the main body line, tack welded, then increased in welds by remote laser welding. The side sill 12 is comprised of a sill inner member panel comprised of a 590 MPa class hot dipped galvannealed steel sheet, a sill inner member reinforcement member comprised of a 1180 MPa class hot dipped galvannealed steel sheet, and a sill outer member panel comprised of a 270 MPa class hot dipped galvannealed steel sheet superposed by flanges formed at their edge parts. At this time, circular shape laser welding is performed to form the laser lap welds 1, then a laser is fired to split the HAZ softened parts and form the laser hardened parts 8.

Figure 10:
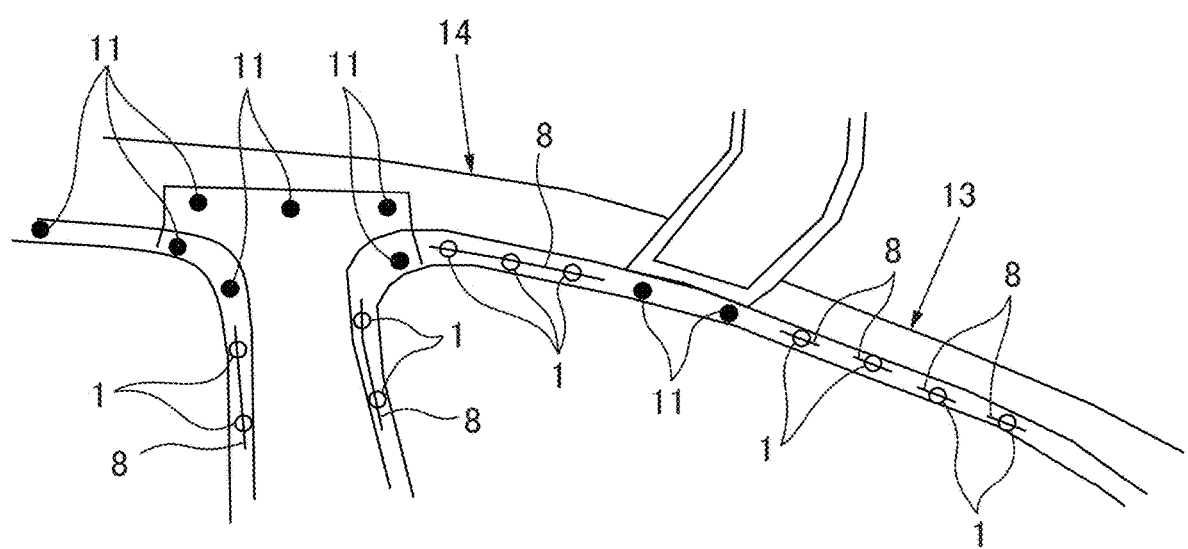
FIG. 10 is a view showing an example of application of the present invention to an A-pillar and roof rail.

FIG. 10 is an explanatory view showing the state of application of the present invention to an A-pillar 13 and roof rail 14.

As shown in FIG. 10, with the A-pillar 13 and roof rail 14 as well, like the center pillar 9, a side panel including the A-pillar 13 and roof rail 14 is assembled with the under body by the main body line and then further welded by remote laser welding. The A-pillar 13 and the roof rail 14 are respectively comprised of shaped panels comprised of two hot stamped members and a 270 MPa class hot dipped galvannealed steel sheet superposed. At this time, circular shape laser welding is performed to form the laser lap welds 1, then a laser is fired to split the HAZ softened parts around the circular shape laser lap welds 1 and form the laser hardened parts 8.

Above, the present invention was explained based on the example of automobile parts having a circular shape laser lap welds. As mentioned above, the embodiments of the present invention are not limited to the above examples. The effects of the present invention are exhibited so long as including the requirements of the present invention. These are included in the scope of the present invention. Below, examples of embodiments different from the above will be explained.

Example 1

Figure 11:
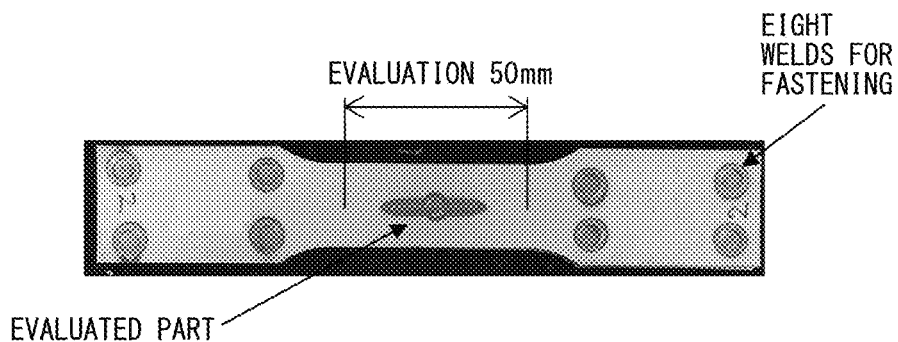
FIG. 11A is a view showing a tensile test piece obtained by C-shape laser lap welding.
FIG. 11B is a view showing a laser lap weld of a comparative example.
FIG. 11C is a view showing a laser lap weld according to an invention example.
FIG. 11D is a graph showing results of a tensile test.
Figure 11:
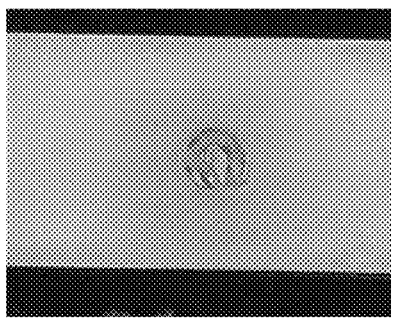
Figure 11:
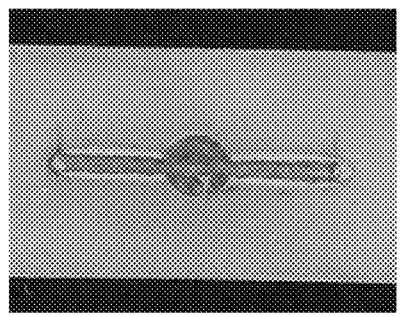
Figure 11:
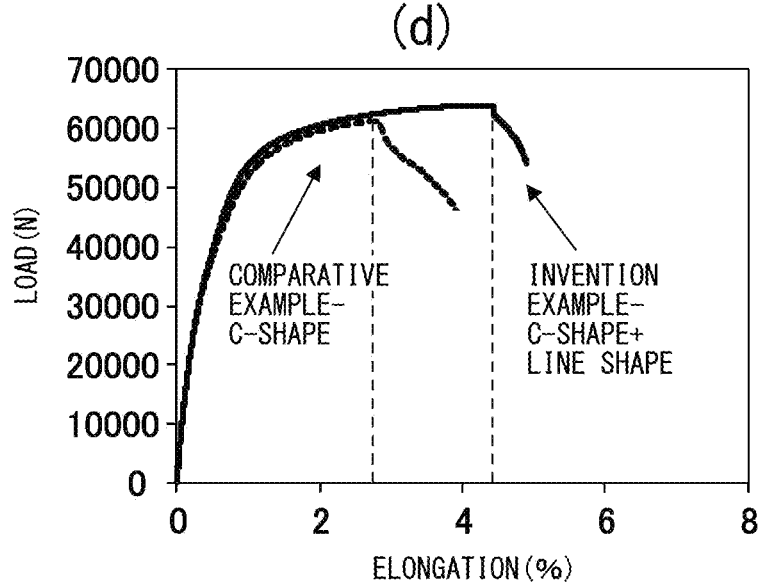

Example 1 is an example of application of the present invention to C-shape laser lap welding. FIG. 11A is an explanatory view showing a tensile test piece, FIG. 11B is an explanatory view showing a laser weld of a comparative example, FIG. 11C is an explanatory view showing a laser weld of an invention example, and FIG. 11D is a graph showing the results of a tensile test.

For the tensile test piece, three sheets of a thickness 0.7 mm 270 MPa class hot dipped galvannealed steel sheet, a thickness 1.4 mm 1310 MPa class steel sheet, and a thickness 1.2 mm 440 MPa class steel sheet were stacked in that order and the gripping parts of the test piece were welded by resistance spot welding to prepare the tensile test piece shown in FIG. 11A.

Next, using a fiber laser under conditions of a beam diameter of 0.6 mm, output of 2.7 kW, and welding speed of 2.0 m/min and use of a galvanomirror, a test piece formed with a diameter approximately 7 mm C-shape laser weld shown in FIG. 11B (comparative example) and a test piece formed with a C-shape weld shown in FIG. 11C, then fired upon by laser in a straight line (invention example) were prepared.

The tensile test was conducted at a tensile speed of 3 mm/min with the prepared welds at the evaluation distance 50 mm.

Figure 12:
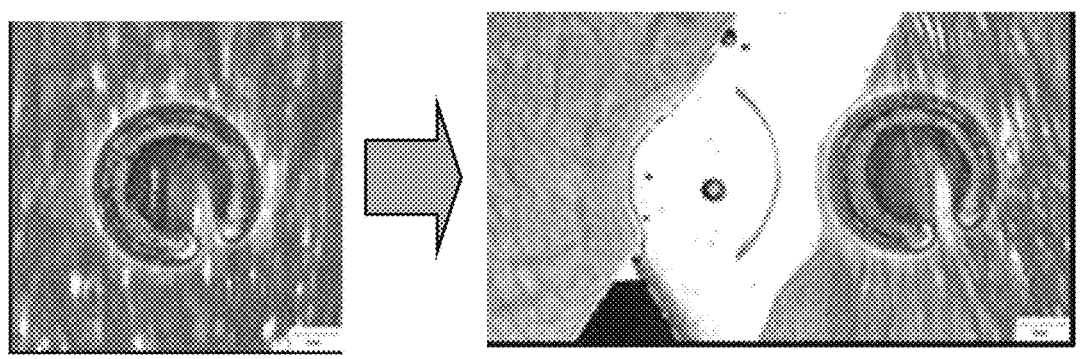
Figure 12:
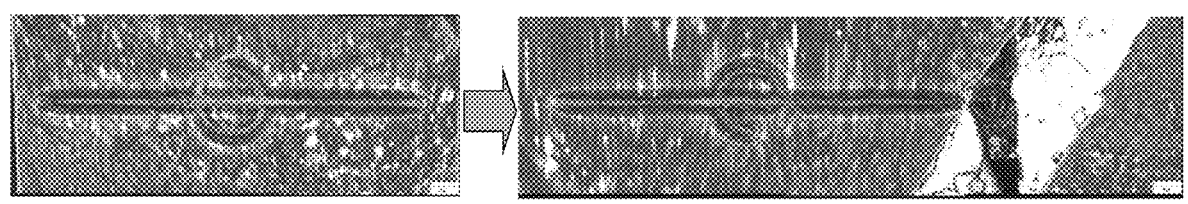

FIG. 12A is an explanatory view showing a break position of the comparative example, while FIG. 12B is an explanatory view showing a break position of an invention example.

As shown in FIG. 11D, in laser welding a C-shape of the comparative example, the elongation at break was 2.7%. Further, as shown in FIG. 12A, the sample broke along the outer circumference of the C-shape.

As opposed to this, in the invention examples, as shown in FIG. 11D, the elongation at break was 4.3%. Further, as shown in FIG. 12B, the break position was at the front end (terminal end) of the laser hardened part.

In this way, the invention examples are improved in elongation at break compared with the comparative example.

INDUSTRIAL APPLICABILITY

The present invention can be utilized for a lap joint joining steel sheets including a high strength steel sheet. In particular, it can be utilized for automobile parts and other machine structure parts.

REFERENCE SIGNS LIST 1. substantially circular (circular shape) laser weld
2. substantially circular (oval shape) laser weld
3. substantially circular (C-shape) laser weld
4. substantially circular (long C-shape) laser weld
5. substantially circular (circular ring shape) laser weld
6. substantially circular (oval ring shape) laser weld
7. substantially circular (double circular ring shape) laser weld
8. straight line hardened part
9. center pillar
10. center pillar reinforcement member
11. spot weld
12. side sill
13. A-pillar
14. roof rail

The invention claimed is:

1. Lap welding method comprising superposing a plurality of steel sheets and firing a laser to form a substantially circular laser weld, which lap welding method comprises scanning the laser in a straight line through an outer edge of said substantially circular laser weld so as to form a hardened part at the steel sheets,
    wherein the hardened part is a reheated and hardened HAZ-softened part formed by the substantially circular laser weld,
    wherein a laser scanning width is at least 10% and 50% or less of a diameter of the substantially circular laser weld,
    wherein said straight line laser scanning operation scans the laser over at least 3 mm from the outer edge of said substantially circular laser weld, and
    wherein at least one steel sheet among said plurality of steel sheets is a steel sheet having a martensite structure.

2. The lap welding method according to claim 1 wherein said straight line laser scanning operation scans the laser in a principal stress direction found in advance.

3. The lap welding method according to claim 2 wherein said substantially circular is a circular shape, oval shape, circular ring shape, oval ring shape, C-shape, long C-shape, or multiple circular ring shape.

4. The lap welding method according to claim 2 wherein a fired width of said straight line laser fired part is smaller than a curvature diameter of the part of the outer edge of said substantially circular laser weld through which said laser is fired in a straight line.

5. The lap welding method according to claim 1 wherein said substantially circular is a circular shape, oval shape, circular ring shape, oval ring shape, C-shape, long C-shape, or multiple circular ring shape.

6. The lap welding method according to claim 1 wherein a fired width of said straight line laser fired part is smaller than a curvature diameter of the part of the outer edge of said substantially circular laser weld through which said laser is fired in a straight line.

7. The lap welding method according to claim 1 wherein said steel sheet having a martensite structure is a steel sheet having a tensile strength of 1180 MPa or more.

8. A lap joint obtained by superposing a plurality of steel sheets and firing a laser to form substantially circular laser weld so as to join said plurality of steel sheets, which lap joint is provided with a hardened part formed in a straight line by firing the laser through an outer edge of said substantially circular laser weld,
    wherein the hardened part is a reheated and hardened HAZ-softened part formed by the substantially circular laser weld,
    wherein a laser scanning width is at least 10% and 50% or less of a diameter of the substantially circular laser weld,
    wherein said straight line laser scanning operation scans the laser over at least 3 mm from the outer edge of said substantially circular laser weld, and
    wherein at least one steel sheet among said plurality of steel sheets is a steel sheet having a martensite structure.

9. The lap joint according to claim 8, wherein said straight line hardened part is formed in a principal stress direction found in advance.

10. The lap joint according to claim 8 wherein said substantially circular is a circular shape, oval shape, circular ring shape, oval ring shape, C-shape, long C-shape, or multiple circular ring shape.

11. The lap joint according to claim 8 wherein a width of said straight line hardened part is smaller than a curvature diameter of the part of the outer edge of said substantially circular laser weld through which said straight line hardened part crosses or contacts.

12. The lap joint according to claim 8 wherein said steel sheet having a martensite structure is a steel sheet having a tensile strength of 1180 MPa or more.

13. A method of production of a lap joint produced by superposing a plurality of steel sheets and firing a laser to form a substantially circular laser weld, which method of production of a lap joint comprises scanning the laser in a straight line through the outer edge of said substantially circular laser weld so as to form a hardened part at the steel sheets,
    wherein the hardened part is a reheated and hardened HAZ-softened part formed by the substantially circular laser weld, wherein a laser scanning width is at least 10% and 50% or less of a diameter of the substantially circular laser weld, wherein said straight line laser firing operation fires the laser over at least 3 mm from the outer edge of said substantially circular laser weld, and wherein at least one steel sheet among said plurality of steel sheets is a steel sheet having a martensite structure.

14. An automobile part provided with a lap joint according to claim 8.

* * * * *